Sept. 8, 1925.

H. M. POTTER

PESSARY

Filed Feb. 19, 1923

1,552,878

Inventor
Helen M. Potter
By Watson E. Coleman
Attorney

Patented Sept. 8, 1925.

1,552,878

UNITED STATES PATENT OFFICE.

HELEN M. POTTER, OF STAMFORD, NEW YORK.

PESSARY.

Application filed February 19, 1923. Serial No. 619,902.

*To all whom it may concern:*

Be it known that I, HELEN M. POTTER, a citizen of the United States, residing at Stamford, in the county of Delaware and State of New York, have invented certain new and useful Improvements in Pessaries, of which the following is a specification, reference being had to the accompanying drawings.

This invention relates to certain improvements in pessaries and it is an object of the invention to provide a novel and improved device of this general character possessing the same general advantages of the device as disclosed in my Patent No. 1,320,648 dated November 4, 1919 and which in addition thereto is provided with means whereby the lower portions of the uterus may be immersed in a medicament in a liquid or semiliquid consistency and in a manner whereby practically all of the restraint is removed from the neck and said lower portion of the uterus.

Another object of the invention is to provide a novel and improved device of this general character comprising a body portion of a fixed formation and which has its lower end portion closed by a sack of soft tissue like rubber or the like adapted to contain suitable medicament, said medicament being either antiseptic, astringent, soothing or healing, whereby the pessary is particularly adapted for use in afflictions such as cancers, ulcers, etc., whereby the lower portion of the uterus is highly inflamed and extremely sensitive.

The invention consists in the details of construction and in the combination and arrangement of the several parts of my improved pessary whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
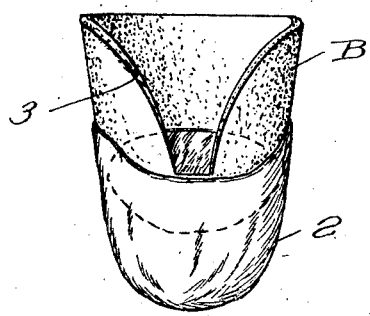
Figure 1 is a view in elevation of a pessary constructed in accordance with an embodiment of my invention.
Figure 2:
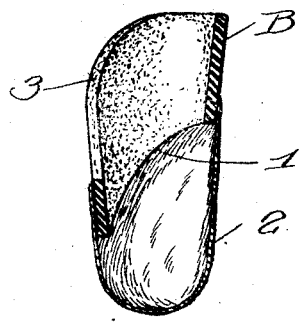
Figure 2 is a sectional view through the device as illustrated in Figure 1.
Figure 3:
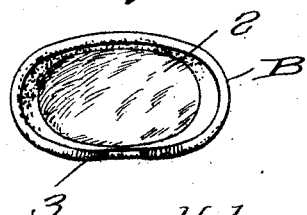
Figure 3 is a top plan of the structure as herein disclosed.

As disclosed in the accompanying drawings, B denotes a tubular body of rubber or other yieldable material, molded or otherwise produced in a fixed formation but capable of ready flexure or bending to permit the desired application. The body B is also of such cross sectional configuration to assure its requisite positioning. Both end portions of the body B are open and the lower edges of the body B are disposed upwardly on arcuate lines as indicated at 1, with the inbow of said edges inwardly directed.

Secured to the lower marginal portions of the body B is a sack 2 of soft tissue like rubber or kindred material which produces a sack closing the lower end of the body B, the connection between the sack 2 and the body B being exteriorly of the body or to the outer faces thereof or in other words the lower portion of the body B is telescopically engaged within the open end portion of the sack 2.

The sack 2 is adapted to contain a suitable supply of medicament, either antiseptic, astringent, soothing or healing. The sack 2 permits the whole lower portion of the uterus to be immersed in the medicament, which is of particular advantage in certain afflictions of the uterus such as cancers, ulcers, etc., resulting in the entire lower portion of the uterus becoming highly inflamed and extremely sensitive. The sack 2 practically relieves the neck and whole lower portion of the uterus from all restraint. The upper end portion of the body B has a side portion materially cut away as at 3 so that one side of the body B is of a weight greater than the opposite side, which arrangement assures the uterus, when the pessary is applied, assuming its natural position.

From the foregoing description it is thought to be obvious that a pessary constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A device of the class described comprising a tubular body formed of pliable material having a fixed formation, the opposite ends of the body being open, the lower edges of the body being disposed upwardly on arcuate lines with the inbow of said edges inwardly directed, and a sack of soft tissue like material closing the lower open end of the body, the lower portion of the body being disposed within the open end of the sack, said sack being secured to the outer faces of the body.

In testimony whereof I hereunto affix my signature.

HELEN M. POTTER.